Figure 1:
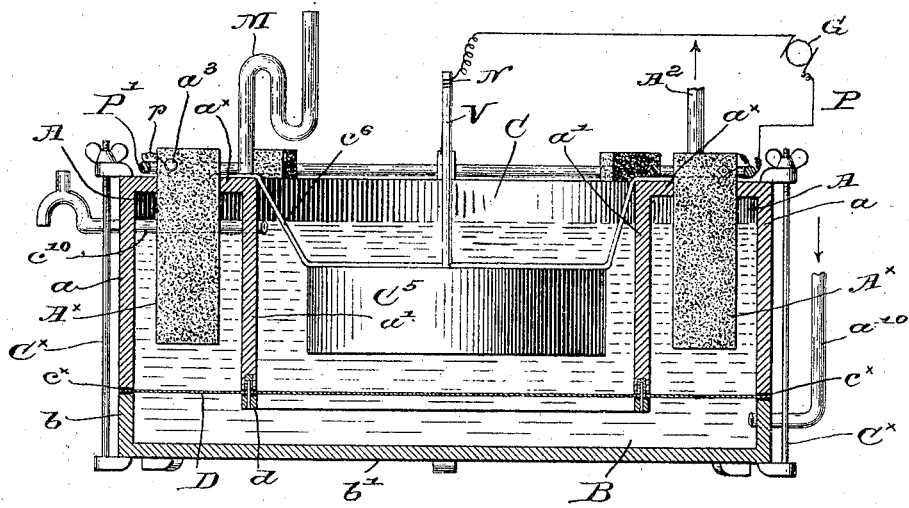

No. 695,033. Patented Mar. 11, 1902.
E. D. CHAPLIN & H. G. HALLORAN.
PRODUCTION OF CHLORIN AND ALKALINE HYDRATES ELECTROLYTICALLY.
(Application filed Apr. 26, 1900.)
(No Model.)

Witnesses.
Thomas J. Drummond,
Edward F. Allen.

Inventors.
Edwin D. Chaplin
Henry G. Halloran,
by Ensby & Gregory
Attys.

THE NORRIS PETERS CO., PHOTO-LITHO., WASHINGTON, D. C.

UNITED STATES PATENT OFFICE.

EDWIN D. CHAPLIN, OF WINCHESTER, AND HENRY G. HALLORAN, OF BOSTON, MASSACHUSETTS, ASSIGNORS TO HENRY DAKIN, OF BOSTON, MASSACHUSETTS.

PRODUCTION OF CHLORIN AND ALKALINE HYDRATES ELECTROLYTICALLY.

SPECIFICATION forming part of Letters Patent No. 695,033, dated March 11, 1902.

Application filed April 26, 1900. Serial No. 14,421. (No specimens.)

*To all whom it may concern:*

Be it known that we, EDWIN D. CHAPLIN, residing at Winchester, in the county of Middlesex, and HENRY G. HALLORAN, residing at Boston, in the county of Suffolk, State of Massachusetts, citizens of the United States, have invented an Improvement in the Production of Chlorin and Alkaline Hydrates Electrolytically, of which the following description, in connection with the accompanying drawings, is a specification, like letters on the drawings representing like parts.

This invention relates to the production of chlorin and alkaline hydrates by electrolytic action from chlorid solutions—such, for instance, as sodium, potassium, or calcium chlorids, &c.; and it has for its object the production of an improved process whereby the components of the solution are separated and effectually isolated in a highly efficient manner. The separation of such salts by electrolysis has been effected by various forms of apparatus, which are all, so far as known to us, open to certain practical and very important objections. One of such processes involves the use of mercury, which forms an amalgam with the separated alkaline metal, and by continually agitating the amalgam in the presence of water the latter is decomposed with the formation of the alkaline hydrate and free hydrogen. This process is efficient so far as output is concerned; but the first cost of the requisite apparatus and the cost of maintenance are so great as to materially reduce the profits. Other forms of apparatus make use of a pervious diaphragm with the object of maintaining the separation of the ions separated by the action of the electric current on the solution which forms the electrolyte; but none of them have any effective means for continuously maintaining the ions separated, there being a constant diffusion and recombination of the ions, producing deleterious compounds—such as hypochlorites, chlorates, &c.—which by their further decomposition furnish nascent oxygen, which attacks and rapidly disintegrates carbon electrodes, necessitating the use of very expensive platinum or platinum alloys commonly employed. Such forms of apparatus are by reason of the formation of deleterious compounds referred to low in efficiency, the caustic solution being mixed with such compounds and the chlorin, if carbon anodes are used, being mixed with carbon dioxid.

By our present invention we obviate the objectionable features of both types of apparatus hereinbefore referred to and not only produce an apparatus low in first cost and cost of maintenance, but by our process we maintain a very effectual and continuous separation of the ions without increasing the resistance of the apparatus, and we obtain pure chlorin free from carbon dioxid and the caustic solution free from hypochlorites.

In carrying out our process, which is a continuous one, we interpose an impervious non-conducting barrier between anode and cathode and complete the electric circuit between them by or through a neutral solution separated from the anode and cathode compartments by a pervious diaphragm.

We have herein shown one form of apparatus for carrying out our process.

Figure 2:
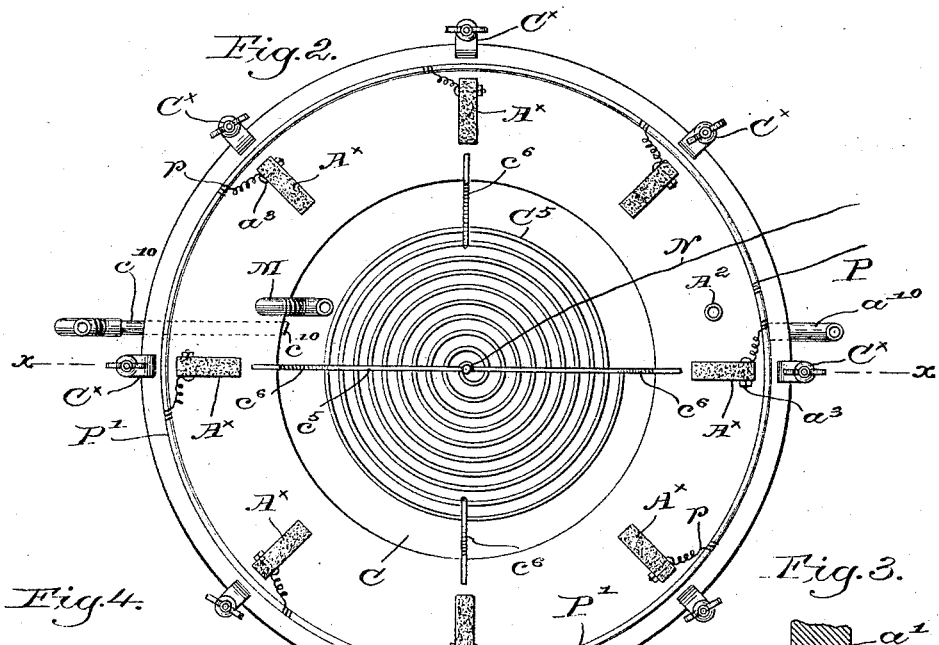
Figure 4:
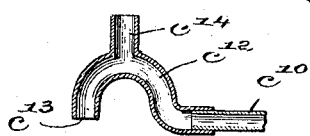
Figure 3:
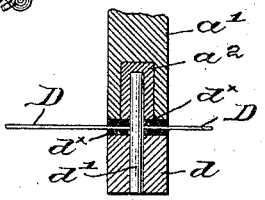

Figure 1 is a cross-sectional view on the line $x\ x$, Fig. 2, of one form of apparatus by which the process hereinafter set forth may be practiced. Fig. 2 is a top or plan view thereof. Fig. 3 is an enlarged sectional detail to be referred to, and Fig. 4 is a detail in elevation of a device for conveniently regulating the flow of the caustic solution.

We have herein shown the apparatus, which will hereinafter be termed the "cell," as circular in form, though this is not material, provided the compartment or chamber which contains the anode and is closed at its top is separated laterally from the cathode-compartment by an impervious non-conducting wall or barrier.

Referring to Fig. 1, the cell is preferably made in two parts, one superposed upon the other, the lower part consisting of a bottom $b'$ and side wall $b$, while the upper part is shown as substantially annular and made up of outer and inner parallel walls $a\ a'$, connected at their upper ends by a cover or top $a^{\times}$, the said member being made of porcelain, stoneware, or other suitable impervious non-conducting material. A pervious diaphragm D, preferably asbestos cloth or other strong and durable fabric which will not be attacked by the operation of the process, is inserted between the adjacent edges of the walls $a$ and $b$ and the joint is closed or made impervious by a suitable cement $c^\times$, Fig. 1, preferably such as will be readily fused at a relatively low temperature—as shellac, asphalt, marine glue, &c.—unaffected by chlorin or salt water. Clamps $C^\times$ are externally applied to the cell and acting on the top and bottom thereof rigidly maintain the two parts of the cell securely locked together. We prefer to secure the diaphragm D to the lower end of the inner wall $a'$, and one convenient mode of attachment is herein shown. A wooden ring $d$ is placed against the under side of the diaphragm beneath the end of the wall $a'$ and secured thereto by wooden dowels $d'$, which pass through the diaphragm into wooden blocks $a^2$, (see also Fig. 3,) inserted in the wall when the cell is made, a joint $d^\times$, of cement, such as herein referred to, being interposed between the diaphragm-ring and lower end of the wall $a'$. In the annular compartment or chamber A, Fig. 1, formed by the top, inner, and outer walls and the diaphragm D, we place the anodes $A^\times$, in the present embodiment of our invention said anodes preferably consisting of blocks, slabs, or sticks of carbon, preferably graphitized, inserted through holes made in the top $a^\times$, the anodes extending well down into the compartment A, which by its extent enables us to employ a large number of anodes, with consequent decreased resistance. The anodes are cemented in place in the top $a^\times$, all joints being made gas-tight, and their exposed upper ends receive iron bolts $a^3$ to serve as binding-posts for short wires $p$, connecting the several anodes with a copper rod $P'$, made as a ring and resting on the top of the cell, said conductor being electrically connected with the positive pole of the generator G, Fig. 1, by wire P. A pipe or conduit $A^2$ leads from the top of the anode-compartment to convey the chlorin therefrom to any suitable receiver, (not shown,) and in Fig. 1 we have shown a manometer M, also connected with the anode-compartment, to indicate the pressure therein. The cathode-compartment C is formed by the inner wall $a'$ and diaphragm D and is open-topped if the liberated hydrogen is not to be saved; but by placing a cover on said compartment the hydrogen may be readily collected and stored.

We have shown the cathode as a sheet of spirally-coiled metal $C^5$, preferably copper, braced at $c^5$, Fig. 2, to preserve its shape and supported in the compartment C in suitable manner, as by hangers $c^6$. The cathode is in electrical connection with the negative pole of the generator by a conductor V, and said cathode may be any metal inert as to alkaline hydrate.

An inlet $a^{10}$ leads into the cell below the diaphragm D to conduct the chlorid solution, such as a solution of sodium or potassium chlorid, from the source of supply (not shown) to the cell, and an overflow pipe or conduit $c^{10}$ passes through the walls $a$ and $a'$, its inner end opening into the cathode-compartment at about the desired liquid-level therein. A device for adjusting this level is shown on the outer end of the pipe $c^{10}$, said device consisting of a gooseneck $c^{12}$, rotatably coupled to the pipe $c^{10}$, so that the mouth $c^{13}$ of the gooseneck can be adjusted as to height, to thereby vary the overflow-level. To prevent siphoning, a short open pipe or header $c^{14}$ is connected with the top of the bend of the gooseneck.

It will be obvious from an inspection of Fig. 1 that an impervious non-conducting barrier—viz., the wall $a'$—is interposed between anode and cathode and that the electric circuit between the anode and cathode will be completed by or through an electrolytic fluid—viz., the neutral solution—which latter is separated from the anode and cathode compartments A C by the pervious diaphragm D, which is permeable to the liquid.

The cell is supplied by pipe $a^{10}$ with the chlorid solution, and for convenience we will refer to brine, a saturated solution of chlorid of sodium, until the level of the liquid in compartments A and C is the same, regulated by the overflow $c^{10}$.

Upon passage of an electric current through the apparatus the ions are separated out, free chlorin being formed in the anode-compartment A and withdrawn by conduit $A^2$, to be absorbed in a suitable chamber or compartment in any desired or well-known manner or otherwise collected and stored for use. At the negative electrode or cathode $C^5$ metallic sodium will be separated, but it acting instantly upon the water of the solution sodium hydrate is formed, with the liberation of hydrogen, which passes off freely from the compartment C or is collected, as may be desired. The alkaline hydrate in solution in the cathode-compartment passes off through the overflow $c^{10}$, to be afterward treated in any desired manner. The process described is continuous, fresh neutral solution being constantly supplied by the conduit $a^{10}$ as the alkaline hydrate solution is withdrawn at $c^{10}$.

In the course of our experiments we have found that the interposition of an impervious non-conducting wall or barrier between anode and cathode will effectually prevent any lateral movement or diffusion of the ions separated by the action of the electric current, which movement, if not prevented, results in a recombination of the ions and the formation of deleterious compounds, as hereinbefore set forth, in addition to causing rapid deterioration of the anode if carbon be employed therefor.

The portion B of the cell below the diaphragm D may be termed the "neutral" compartment or chamber, the diaphragm precluding any diffusion from anode or cathode compartments into the neutral solution in said neutral compartment, it being remembered that there is constant inflow of solution into compartment B. The flow of the electrolyte toward the cathode is permitted, however, by the pervious diaphragm, and the latter, in conjunction with the impervious barrier $a'$, thus prevents any recombination of the separated ions in the neutral chamber, while said diaphragm offers no material obstacle to the completion of the electric circuit through the neutral solution.

In practicing our invention as hereinbefore set forth we have by many tests obtained substantially ninety per cent. of the theoretical efficiency, which is about 1.32 grams of chlorin and 1.49 grams caustic per hour for each ampere of current.

Not only is the apparatus cheap to construct and maintain, but it enables us to attain high efficiency and purity of product.

We prefer to make the cell circular, as herein shown, with an annular anode-compartment and a concentric cathode-compartment, as such form is very convenient and readily constructed; but the shape of the cell may be modified and various details of construction can be changed without departing from the spirit and scope of our invention, and while the apparatus herein shown is especially adapted for carrying out our process the latter is not restricted to such apparatus for its operation.

Having described our invention, what we claim as new, and desire to secure by Letters Patent, is—

1. In the separation of chlorin and alkaline hydrates, subjecting a chlorid solution as the electrolyte to the action of an electric current to separate the ions; maintaining them separated laterally by interposing an impervious, non-conducting barrier between anode and cathode; and utilizing the chlorid solution to complete the electric circuit between anode and cathode while separating such solution by a pervious non-dialytic diaphragm from both the anode and cathode compartments.

2. The process of electrolytically separating chlorin and alkaline hydrate from chlorid solutions as the electrolyte, which consists in interposing an impervious, non-conducting barrier between anode and cathode, and completing an electric circuit between them by or through a neutral solution separated from both the anode and cathode compartments by a pervious non-dialytic diaphragm.

3. The process of electrolytically separating chlorin and alkaline hydrate from chlorid solutions as the electrolyte, which consists in interposing an impervious, non-conducting barrier between anode and cathode, completing an electric circuit between them by or through neutral solution separated from the anode and cathode compartments respectively by a horizontal pervious diaphragm, introducing fresh neutral solution below the diaphragm and withdrawing the caustic solution from the cathode-compartment.

4. In the process of electrolytically separating chlorin and alkaline hydrates from chlorid solutions, completing the electric circuit between anode and cathode by or through the chlorid solution, which constitutes the electrolyte; maintaining the lateral separation of the ions by an interposed non-conducting, impervious barrier between the anode and cathode, and preventing diffusion of the separated ions from the anode and cathode compartments by a pervious non-dialytic diaphragm interposed between the chlorid solution and the anode and cathode.

5. An electrochemical process which consists in supplying the electrolyte to the electrolytic cell below the anode and cathode, completing the electric circuit between anode and cathode by or through the electrolyte, maintaining the lateral separation of the ions by an upright impervious, non-conducting barrier between anode and cathode withdrawing the separated ions, and preventing diffusion of the latter into the electrolyte by a horizontal, pervious diaphragm at the foot of the barrier and interposed between the anode and cathode and the incoming electrolyte.

6. An electrochemical process for producing chlorin and an alkaline hydrate from a chlorid solution, which consists in maintaining by a transverse pervious diaphragm a zone of undecomposed chlorid solution within an electrolytic cell below the chlorin and alkaline hydrate at their respective electrodes; supplying fresh quantities of solution to such zone below the diaphragm, completing the electric circuit between anode and cathode by or through the electrolytic solution, and maintaining a lateral separation of the ions by an upright impervious, non-conducting barrier between the anode and cathode, the incoming fresh solution completing the electric circuit between the electrodes and by its inflow displacing the separated ions toward their respective electrodes, from which regions the ions are withdrawn as displaced.

7. The process of dissociating soluble salts into their acid and basic constituents by electrolysis which consists in separating the electrolyte into three bodies, one of which is in communication with each of the other two through a pervious diaphragm, the latter two bodies being laterally separated from each other by an impervious barrier, the level of the liquid in the said two bodies of the electrolyte being maintained at the same level by the inflow of the electrolyte into the other body thereof, and passing an electric current through the said several bodies of the electrolyte.

In testimony whereof we have signed our names to this specification in the presence of two subscribing witnesses.

EDWIN D. CHAPLIN.
HENRY G. HALLORAN.

Witnesses:
JOHN C. EDWARDS,
AUGUSTA E. DEAN.